(12) United States Patent
Ach

(10) Patent No.: US 9,758,345 B2
(45) Date of Patent: Sep. 12, 2017

(54) ELEVATOR BELT, METHOD FOR PRODUCING SUCH AN ELEVATOR BELT, AND ELEVATOR SYSTEM HAVING SUCH A BELT

(75) Inventor: Ernst Ach, Ebikon (CH)

(73) Assignee: Inventio AG, Hergiswil (CH)

( * ) Notice: Subject to any disclaimer, the term of this patent is extended or adjusted under 35 U.S.C. 154(b) by 1680 days.

(21) Appl. No.: 12/450,494

(22) PCT Filed: Mar. 18, 2008

(86) PCT No.: PCT/EP2008/053206
§ 371 (c)(1),
(2), (4) Date: Feb. 11, 2010

(87) PCT Pub. No.: WO2008/116784
PCT Pub. Date: Oct. 2, 2008

(65) Prior Publication Data
US 2010/0140022 A1    Jun. 10, 2010

(30) Foreign Application Priority Data

Mar. 28, 2007   (EP) .................................. 07105131
Feb. 12, 2008   (WO) ................ PCT/EP2008/001068

(51) Int. Cl.
*B66B 7/06*    (2006.01)
*F16G 5/06*    (2006.01)
*D07B 1/22*    (2006.01)

(52) U.S. Cl.
CPC ............... *B66B 7/062* (2013.01); *F16G 5/06* (2013.01); *D07B 1/22* (2013.01); *D07B 2501/2007* (2013.01)

(58) Field of Classification Search
CPC ... D07B 2501/2007; B66B 7/06; B66B 7/062; F16G 5/06; F16G 5/20; F16G 1/28
USPC ......... 187/251, 254, 255; 474/252, 260, 265
IPC ...... D07B 1/22,1/14; D07D 1/16; B66B 11/00, 11/04, 11/08; F16G 9/00, 1/16, 1/28

See application file for complete search history.

(56) References Cited

U.S. PATENT DOCUMENTS

| | | | | |
|---|---|---|---|---|
| 2,518,454 A | * | 8/1950 | Elliott | 174/114 R |
| 3,473,400 A | * | 10/1969 | Garbin et al. | 474/260 |
| 4,197,695 A | * | 4/1980 | Hughes et al. | 57/7 |
| 4,681,558 A | * | 7/1987 | Rausch | 474/205 |
| 4,790,802 A | * | 12/1988 | Onoe et al. | 474/260 |
| 5,566,786 A | * | 10/1996 | De Angelis et al. | 187/266 |
| 5,802,839 A | * | 9/1998 | Van Hook | 57/236 |
| 5,807,194 A | * | 9/1998 | Knutson et al. | 474/268 |
| 6,132,328 A | * | 10/2000 | Kinoshita et al. | 474/260 |
| 6,220,983 B1 | * | 4/2001 | Osako et al. | 474/260 |

(Continued)

FOREIGN PATENT DOCUMENTS

| | | |
|---|---|---|
| AU | 2468771 A | 7/1972 |
| DE | 1110397 B | 7/1961 |

(Continued)

*Primary Examiner* — Minh Truong
(74) *Attorney, Agent, or Firm* — Chiesa Shahinian & Giantomasi PC

(57) ABSTRACT

An elevator belt comprising a belt body made of a first material, a reinforcement arrangement having at least one reinforcement provided on the belt body, and a tube arrangement made of a second material having at least one tube, the at least one reinforcement of the reinforcement arrangement being provided in a tube of the tube arrangement.

19 Claims, 3 Drawing Sheets

(56) References Cited

U.S. PATENT DOCUMENTS

| | | | |
|---|---|---|---|
| 6,295,799 B1 | 10/2001 | Baranda | |
| 7,036,298 B2 * | 5/2006 | Honda | 57/214 |
| 7,040,456 B2 * | 5/2006 | Ach et al. | 187/251 |
| 7,137,483 B2 * | 11/2006 | Kato et al. | 187/251 |
| 7,828,121 B2 * | 11/2010 | Parrini | 187/251 |
| 2002/0094897 A1 * | 7/2002 | Love et al. | 474/260 |
| 2004/0026178 A1 * | 2/2004 | Honda | 187/251 |
| 2004/0206579 A1 * | 10/2004 | Baranda et al. | 187/254 |
| 2004/0216958 A1 * | 11/2004 | Ach | 187/254 |
| 2004/0256180 A1 * | 12/2004 | Eichhorn et al. | 187/254 |
| 2004/0262087 A1 * | 12/2004 | Ach | 187/264 |
| 2005/0006180 A1 * | 1/2005 | Mustalahti et al. | 187/254 |
| 2005/0245338 A1 * | 11/2005 | Eichhorn et al. | 474/237 |
| 2006/0287148 A1 * | 12/2006 | Wood et al. | 474/260 |
| 2007/0232429 A1 * | 10/2007 | Knox | 474/205 |
| 2007/0249450 A1 * | 10/2007 | Shiriike | 474/260 |
| 2008/0087500 A1 * | 4/2008 | Ach et al. | 187/255 |

FOREIGN PATENT DOCUMENTS

| | | |
|---|---|---|
| EP | 1477449 A | 11/2004 |
| EP | 1555234 A1 | 7/2005 |
| WO | WO 01/14630 A | 3/2001 |
| WO | WO 2004/029343 A | 4/2004 |
| WO | 2007055701 1 A | 5/2007 |

* cited by examiner

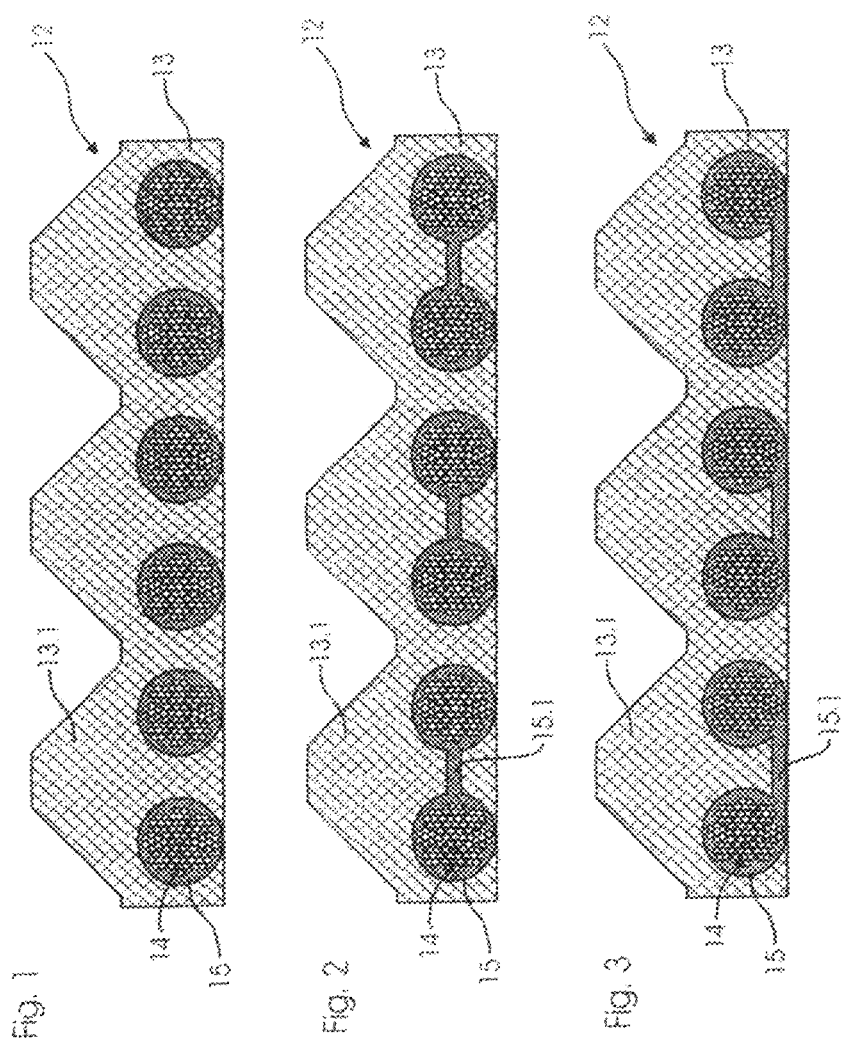

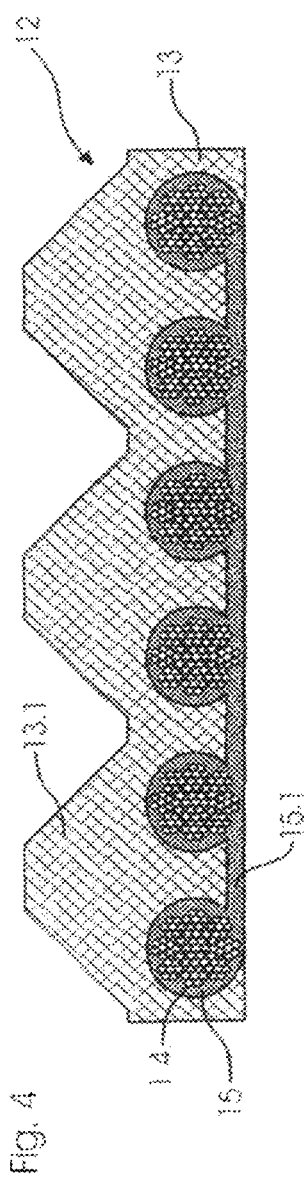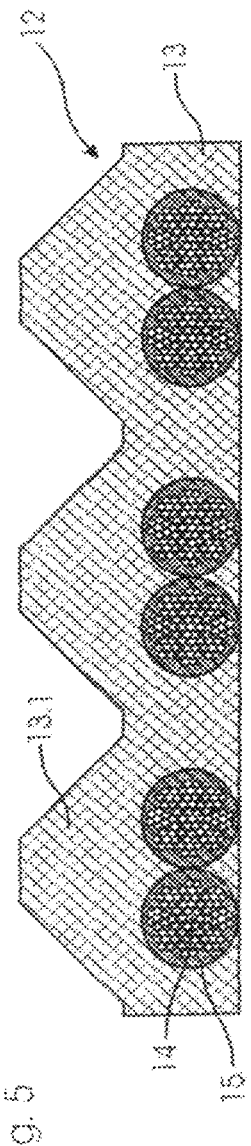

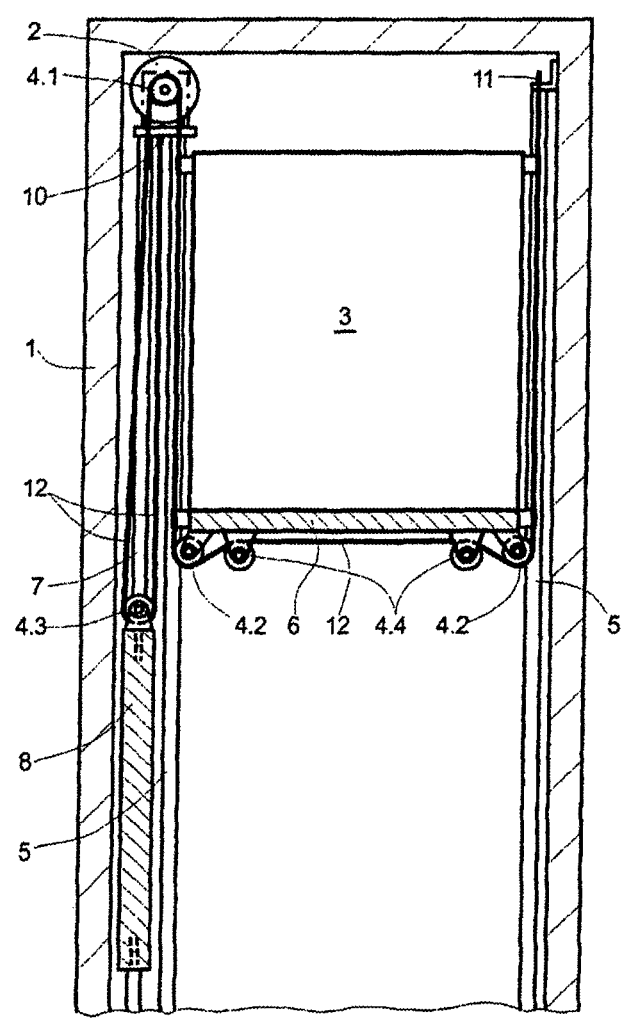

ELEVATOR BELT, METHOD FOR PRODUCING SUCH AN ELEVATOR BELT, AND ELEVATOR SYSTEM HAVING SUCH A BELT

CROSS REFERENCE TO PRIOR APPLICATION

This is a U.S. National Phase Application under 35 U.S.C. §371 of International Patent Application No. PCT/EP2008/053206, filed Mar. 18, 2008, and claims benefit of EP 07105131.2, filed on Mar. 28, 2007, which is incorporated by reference herein. The International Application was published in German on Oct. 2, 2008 as WO/2008/116784 under PCT Article 21(2).

FIELD OF THE INVENTION

The present invention relates generally to an elevator belt, to a production method for an elevator belt of this type, and to an elevator system having an elevator belt of this type.

BACKGROUND OF THE INVENTION

An elevator system comprises an elevator cabin and as a rule a compensating weight or counterweight, which can be moved in an elevator shaft or along free-standing guide devices. The elevator cabin and the compensating weight or counterweight can be connected to one another via at least one belt-like carrier means, in order to compensate at least partially for the weight of the elevator cabin. In order to produce the movement, the elevator system has at least one drive with at least in each case one drive wheel which transmits the required drive forces via at least one belt-like drive means to the elevator cabin and optionally to the compensating weight or counterweight.

The carrier means and the drive means can be formed by separate belts, for example in the case of a drum elevator, the carrier means wrapping around pure deflection elements and coupling the elevator cabin and the compensating weight to one another, while the drive means are wound onto the drive wheel. The functions of the carrier means and the drive means are preferably fulfilled by a combined carrier and drive means, which is the case, for example, in what is known as a driving-pulley elevator. Here, at least one belt-like carrier and drive means wraps around at least one drive wheel, the counterweight compensating at least partially for the weight of the elevator cabin and at the same time ensuring the necessary drive capability between the drive wheel and the carrier and drive means.

A belt according to the present invention can be used for each of the above-described functions, that is to say as carrier means, as drive means and also as combined carrier and drive means. It is therefore denoted uniformly in the following text as an elevator belt.

Elevator belts of this type usually comprise a belt body made from an elastomer. In order to transmit the elevator forces, it is known, for example from EP 1 555 234 B1, to embed tensile force carriers in the form of steel and/or plastic ropes in the belt body. In order to increase the contact pressure on the drive wheel and therefore the traction or tractability with the same radial force and therefore the same bearing loading and belt tension, it is known, furthermore, from EP 1 555 234 B1 to configure that contact face of the belt body which interacts with a drive wheel with V-ribs which come into engagement with correspondingly shaped grooves on the running face of the drive wheel. At the same time, the V-ribs ensure the guidance of the elevator belt on the drive wheel.

The use of tensile force carriers in the form of ropes having small diameters makes it possible to use drive wheels having small diameters. The output shaft of the drive can even be configured itself as a drive wheel. Therefore, the following text speaks uniformly of drive wheels, which comprises in equal measure conventional drive pulleys having relatively large diameters but also drive wheels having relatively small diameters and, in particular, also the output shaft of the drive of a elevator system.

Drive and deflection wheels having small diameters have the disadvantage, however, that the tensile force carriers exert a high surface pressure on the belt bodies which surround them in those regions of the elevator belt which in each case rest on a drive or deflection wheel. In particular, if the tensile force carriers also have small diameters, the abovementioned surface pressure can be increased here to such an extent that there is a risk of damaging the belt body. Moreover, in the case of a drive wheel having a low diameter, the traction force is transmitted from the drive wheel via the belt body to the tensile force carriers along a relatively short belt section, which correspondingly has the consequence of high shearing stresses between the belt body and the tensile force carriers.

On account of the above-described effects, damage of the belt body can occur, for example in the form of (micro-) abrasion, shattering of the elastomer which surrounds the tensile force carriers, or tensile force carriers cutting into the elastomer.

SUMMARY OF THE INVENTION

It is therefore an object of the present invention to provide an elevator system, in which the risk of the elevator belt being destroyed is reduced and its service life is increased. It is a further object of the present invention to provide an elevator belt for an elevator system of this type, which elevator belt can also transmit relatively high forces. It is a further object of the present invention to specify a method for producing an elevator belt of this type.

In order to achieve these objects, the present invention provides an elevator belt, a production method of the elevator belt, and an elevator system comprising the elevator belt, wherein the elevator belt comprises a belt body made from a first material and a tensile force carrier arranged in the belt body. The belt further comprises at least one tube made from a second material and embedded in the belt body wherein the tensile force carrier is arranged in the embedded tube.

Further objects, advantages and features of the present invention will become evident from the following detailed description, exemplary embodiments, and the accompanying drawings.

BRIEF DESCRIPTION OF THE DRAWINGS

FIG. 1 illustrates a cross section through an elevator belt according to an embodiment of the present invention;

FIG. 2 illustrates a cross section through an elevator belt according to an embodiment of the present invention;

FIG. 3 illustrates a cross section through an elevator belt according to an embodiment of the present invention;

FIG. 4 illustrates a cross section through an elevator belt according to an embodiment of the present invention;

FIG. 5 illustrates a cross section through an elevator belt according to an embodiment of the present invention; and FIG. 6 illustrates a section parallel to an elevator cabin front, through an elevator system according to an embodiment of the present invention.

DETAILED DESCRIPTION

An elevator belt for a elevator system according to an embodiment of the present invention comprises a belt body made from a first material, a tensile force carrier arrangement having at least one tensile force carrier, which tensile force carrier arrangement is arranged in the belt body, and a tube arrangement made from a second material having at least one tube, at least one tensile force carrier of the tensile force carrier arrangement being arranged in a particular tube of the tube arrangement, which tube is assigned to said tensile force carrier. A plurality, preferably all, of the tensile force carriers of the tensile force carrier arrangement are preferably arranged in each case one particular tube of the tube arrangement.

As a result of the arrangement of a tensile force carrier in a tube made from a second material which is preferably more solid, tougher, less elastic, harder and/or less susceptible to stress concentrations than the first material, the tensile, compressive and shearing forces which act on the tensile force carrier are transmitted first of all to the tube and can be transmitted by the latter more homogeneously to the belt body which surrounds said tube at least partially, which counteracts damage to the belt body as a result of high point forces. The tube can therefore distribute the forces more uniformly between the tensile force carrier and the belt body.

At the same time, the surface area is advantageously increased, over which the forces are transmitted between the tensile force carrier and the belt body, with the result that the surface area loads which occur are reduced or higher forces can be transmitted.

The enlarged surface area between the tubes of the tube arrangement and the belt body can improve the connection between said two components of the elevator belt. Secondly, the material proportion of the tube arrangement in the overall volume of the elevator belt can be kept small as a result of the arrangement of the tensile force carrier or carriers in each case particular tubes, with the result that the first material of the belt body which preferably has satisfactory damping, friction and/or shearing deformation properties can form a high material proportion in the overall volume of the elevator belt.

At least one tensile force carrier of the tensile force carrier arrangement preferably comprises a wire rope or a synthetic fiber rope which is constructed from singly or multiply stranded wires or wire strands or from singly or multiply stranded synthetic fiber yarns or synthetic fiber strands. In particular, in the case of multiple layer tensile force carriers, in which individual wires or synthetic fiber yarns are laid to form strands and the latter are in turn laid to form the tensile force carrier, the tube which surrounds the tensile force carrier brings about a more homogeneous distribution of the forces which are exerted by the individual wires or yarns or by the individual strands. These forces are first of all absorbed by the tube, are distributed in the latter at least partially and are transmitted more uniformly to the belt body by the tube.

For the sake of simplification, only tensile force carriers in the form of wire ropes made from stranded wires or wire strands will be mentioned in the following text.

One or more tubes of the tube arrangement can envelop in each case one tensile force carrier of the tensile force carrier arrangement in the manner of a cover, with the result that the interior of the tensile force carriers is free from a second material. In particular, one or more tensile force carriers can be braided with the second material in a single layer or in multiple layers. A cover-like envelope of this type can advantageously make a certain micromovement possible of individual wires or strands of the tensile force carrier relative to one another and thus lead to stress equalization, in particular in the wraparound region of a drive or deflection wheel.

In addition or as an alternative, one or more tensile force carriers of the tensile force carrier arrangement can be embedded in each case in a strand-like tube of the tube arrangement, on the inner side of which the second material which forms the strand-like tube is connected positively to the surface structure of the embedded tensile force carrier, it also being possible for the second material to penetrate into existing intermediate spaces of the tensile force carrier. A strand-like tube of this type can absorb the forces from the individual wires or strands of the tensile force carrier in a particularly satisfactory manner and, in addition, can reduce the friction of the individual wires or strands of the tensile force carrier against one another.

An elevator belt according to the invention can comprise cover-like and strand-like tubes. Equally, all the tubes of the tube arrangement can also be of uniformly cover-like or strand-like configuration. The at least one tensile force carrier is preferably surrounded by a concentric tube.

It is not necessary to arrange a tensile force carrier in every tube of the tube arrangement. Empty tubes can be provided as dummy tubes, in order to produce elevator belts with a structurally identical construction but different tensile strengths and weights. In particular, uniform belt bodies can thus be used which receive a uniform number of tubes, optionally empty tubes or tubes having a tensile force carrier being arranged.

It is not necessarily required in the reverse case that all the tensile force carriers are arranged in tubes. In addition to tensile force carriers which are arranged in tubes, further tensile force carriers can also be arranged directly in the belt body, which further tensile force carriers do not need to be enveloped by a tube, for example on account of a greater diameter and therefore greater surface area and a lower stress concentration and/or on account of lower loads.

However, in each case one tensile force carrier is preferably assigned to a tube or in each case one tube is assigned to a tensile force carrier.

Two or more tubes of the tube arrangement can be connected to one another via in each case one web. This positions the tensile force carriers relative to one another, in particular during the embedding into the belt body during the production. Moreover, the larger units which are produced by the webs can be embedded into the belt body more precisely in a positionally correct manner.

In an elevator belt according to one refinement of the present invention, a web is arranged substantially centrally with respect to the tubes which are connected by it and with respect to the tensile force carriers which are arranged therein. Webs of this type impart an increased rigidity in the transverse direction to the structures comprising tensile force carriers and tubes which are connected to one another, which achieves a situation where the elevator belt also extends perfectly rectilinearly on long, unguided belt sections and does not tend to oscillate. Moreover, as a result of webs of this type, the tensile force carriers or tubes which are connected by it can be supported mutually in a particularly satisfactory manner. The arrangement of the webs centrally with respect to the tubes is particularly simple in terms of manufacturing technology.

As an alternative, a web can also be arranged substantially tangentially with respect to the tubes which are connected by it. Webs which are arranged in this way also impart an increased rigidity in the transverse direction to the structures comprising tensile force carriers and tubes which are connected to one another, with the result that the elevator belt also extends perfectly rectilinearly on long, unguided belt sections and does not tend to oscillate.

Webs which are arranged substantially tangentially with respect to the tubes which are connected by them can advantageously form at least partially a rear side of the elevator belt, which rear side lies opposite a contact face for interacting with a drive wheel of the elevator system. The rear side of the elevator belt therefore comprises at least partially the second material. This can have a low coefficient of friction, preferably a coefficient of friction of $\mu \leq 0.3$, particularly preferably of $\mu \leq 0.25$ and, in particular, of $\mu \leq 0.2$, and thus reduce the friction during a deflection around the rear side of the elevator belt.

For this purpose, it can be advantageous, in particular, to connect all the tubes of the tube arrangement to one another by way of a web which then substantially forms the rear side of the elevator belt. If the second material is more abrasion-resistant than the first material, the abrasion which occurs during a deflection around the rear side of the elevator belt can be reduced and the service life of the elevator belt can thus be increased.

Mixed forms of the above-described embodiments are also possible, in which a part of the tubes of the tube arrangement are connected to one another via central webs and another part are connected to one another via tangential webs, with the result that the advantages of the foregoing embodiments can be realized.

The elevator belt particularly advantageously has a contact face for interacting with a drive wheel of the elevator system, in which contact face at least one V-rib, preferably a plurality of V-ribs which extend in the longitudinal direction of the elevator belt are formed. Since the spacing between the tensile force carriers and the flanks of the V-ribs is usually small in V-rib belts of this type, but secondly is to be as uniform as possible, the more homogeneous distribution of the forces here which is brought about by the tube arrangement and, in particular, the more precise positioning of the individual tensile force carriers relative to one another and with respect to the belt body are particularly favorable.

According to a further embodiment of the present invention, at least one V-rib has a substantially trapezoidal or wedge-shaped cross section having a flank angle of from 60° to 120° between its two flanks. Equally, other cross-sectional shapes are also possible, for example triangular or circular segment-shaped cross sections.

The first material for the belt body preferably comprises an elastomer, in particular polyurethane, chloroprene rubber and/or ethylene-propylene-diene rubber or a mixture of at least two elastomers. An elastomeric belt body of this type is sufficiently flexible for wrapping around drive or deflection wheels. At the same time, a material of this type advantageously damps oscillations and jolts in the elevator belt in a known manner. Simultaneously, during interaction with a running face of a drive wheel, it endures the shearing deformation which is required to transmit the tensile forces into the elevator belt, on account of its elastic properties.

Since the forces are introduced into it more homogeneously via the tube arrangement, a relatively soft material can be selected for the belt body, the hardness of which at room temperature is advantageously less than 90 Shore (A), preferably less than 85 Shore (A) and particularly preferably less than 80 Shore (A).

In order that the second material can endure the relatively high local surface pressure which is exerted by the tensile force carriers on their envelope, the second material is preferably harder than the first material. In a further advantageous embodiment, at room temperature, it has a hardness of at least 85 Shore (A), preferably of at least 87.5 Shore (A) and particularly preferably a hardness of at least 90 Shore (A). Even under high loading, the tensile force carriers do not cut into a material of this hardness, or only cut into it a little. It also endures compressive and/or shearing stresses which occur, without exhibiting an increased abrasion or shattering.

The second material can comprise a thermoplastic polymer, in particular polyamide (PA), polyethylene (PE), polyester, in particular polyethylene terephthalate (PET) and/or polycarbonate (PC), polypropylene (PP), polybutene-terephthalate (PBT), polyethersulfone (PES), polyphenylene sulfide (PPS), polytetrafluor ethylene (PTFE), polyvinyl chloride (PVC) or polyblend and/or a woven fabric from a thermoplastic polymer of this type.

A manufacturing method for an elevator belt according to a further embodiment of the present invention comprises the following steps:

a) production of the tube arrangement from the second material.

b) Arrangement of the tensile force carrier or carriers of the tensile force carrier arrangement in the tube or tubes of the tube arrangement. For this purpose, the individual tensile force carriers can, in particular, be encapsulated or braided with the second material. Equally, the tube arrangement can be extruded, in particular high pressure extruded, the tensile force carriers being introduced into the tubes during or after extrusion.

c) Production of the belt body from the first material. This can preferably take place by extruding the first material into the mold of the belt body.

d) Connection of the belt body and the tube arrangement. This can take place, for example, by the tensile force carriers which are enveloped by way of the second material being embedded into the belt body during extruding of the latter. Here, an adhesive, in particular a thermal adhesive, can preferably be applied between the tube arrangement and the belt body and bond the latter to one another particularly firmly.

The abovementioned steps a) to d) do not necessarily have to be carried out in this order.

An elevator system according to the present invention comprises an elevator cabin, a drive having at least one drive wheel, and a belt arrangement having at least one elevator belt according to an embodiment of the present invention. The belt arrangement can also advantageously comprise a plurality of elevator belts according to various embodiments of the present invention, which elevator belts can be connected to one another, for example, positively, fixedly or releasably. This makes it possible to assemble a relatively wide belt arrangement from a plurality of narrow belts which are easier to handle, on site. In yet a further embodiment of the present invention, at least one drive wheel has a V-rib profile which corresponds to the contact face of the elevator belt, that is to say is of substantially complementary configuration to said contact face.

FIG. 1 shows a cross section through an elevator belt 12 according to an embodiment of the present invention. Said elevator belt comprises a tube arrangement having a plurality of individual tubes 15 made from a thermoplastic polymer, from polyamide in the exemplary embodiment. In each case one tensile force carrier 14 is arranged in each of the tubes, the tensile force carrier comprising a steel wire rope which is wound together from strands which for their part are wound together from steel wires.

During the production of the elevator belt 12, the individual tensile force carriers are encapsulated with polyamide, the intermediate spaces between the steel wires also being filled as completely as possible with polyamide. Subsequently, a belt body 13 made from an elastomer, from polyurethane in the exemplary embodiment, is extruded onto the tube arrangement. The individual tubes have a larger cross section than the tensile force carriers which are arranged in them. During the extruding process, they can therefore be guided positionally correctly in an improved manner with respect to one another and with respect to the belt body 13 which is produced, in particular with respect to its V-ribs 13.1. In order to achieve a particularly highly loadable connection between the tubes and the elastomer of the belt body, the tubes can be coated with an adhesion promoter, preferably in the form of an adhesive. Each V-rib 13.1 is particularly preferably assigned two tensile force carriers 14, with the result that each tensile force carrier 14 is assigned a flank of said V-rib 13.1, via which flank a traction force is substantially transmitted from a drive wheel to said tensile force carrier.

In a modification (not shown) of an embodiment of the present invention, the contact face which is formed by the V-ribs 13.1 is provided with a thin coating of polyamide, in order to lower the coefficient of friction. This can be appropriate if the elevator belt exhibits a tractability which is excessively high for use in a certain elevator. Moreover, a polyamide coating of this type reduces the wear of the contact face and reduces the risk of the V-ribs of the elevator belt 12 jamming in the grooves of a drive wheel.

FIG. 2 shows a cross section through an elevator belt 12 according to an embodiment of the present invention. Components which coincide with the embodiment illustrated in FIG. 1 are denoted by the same designations, with the result that only the differences from FIG. 1 will be addressed in the following text.

In accordance with FIG. 2, each of the two tubes 15 of the tube arrangement which are assigned to a V-rib 13.1 are connected to one another by a web 15.1. The latter is arranged centrally with respect to the tensile force carriers 14 and the tubes 15 which surround the latter concentrically. Webs of this type impart an increased rigidity in the transverse direction to the structures comprising in each case two tubes and tensile force carriers which are connected to one another, which achieves a situation where the elevator belt also extends perfectly rectilinearly on long, unguided belt sections and does not tend to oscillate.

In order to produce the elevator belt according to this embodiment, the tube pairs of the tube arrangement are extruded under high pressure, the tensile force carriers 14 being fed to an extrusion nozzle in such a way that a tensile force carrier 14 is arranged substantially centrally in each tube 15, the second material of the tube 15 advantageously filling the existing intermediate spaces between the individual wires of the tensile force carrier 14 as completely as possible. In a further step, the tube pairs are once again fed positionally correctly to an extruder, in which the belt body 13 is extruded and at the same time the tube arrangement is embedded into the latter. Here, the webs 15.1 are enclosed on both sides by its first material of the belt body. Since in each case two tubes having embedded tensile force carriers are spaced apart from one another such that they cannot be displaced and the tube pairs form larger units, the latter can more easily be assigned positionally correctly to the respective V-ribs 13.1.

FIG. 3 shows a cross section through an elevator belt 12 according to an embodiment of the present invention. Components which coincide with FIG. 2 are denoted by the same designations, with the result that only the differences from FIG. 2 will be addressed in the following text.

In accordance with FIG. 3, the webs 15.1 which in each case connect to one another two tubes 15 which are assigned to a V-rib 13.1 and have tensile force carriers 14 arranged in them are arranged tangentially with respect to said tubes 15. Here, they form a part of a rear side (at the bottom in FIG. 3) of the elevator belt 12. The coefficient of friction of said belt rear side which is reduced in comparison with the coefficient of friction of the elastomer of the belt body imparts advantageous properties to the elevator belt during its deflection about nonprofiled deflection pulleys.

In this arrangement of the webs 15.1, they also impart an increased rigidity in the transverse direction to the structures comprising tubes and tensile force carriers which are connected to one another, which achieves a situation where the elevator belt also extends rectilinearly on long, unguided belt sections and does not tend to oscillate.

FIG. 4 shows a cross section through an elevator belt 12 according to an embodiment of the present invention. Components which coincide with FIG. 3 are denoted by the same designations, with the result that only the differences from FIG. 3 will be addressed in the following text.

In accordance with FIG. 4, all the tubes 15 with the tensile force carriers 14 which are arranged in them are connected to one another by a single web 15.1 which is arranged tangentially with respect to said tubes 15 and forms substantially the rear side of the elevator belt 12, which rear side is provided for the purpose of being deflected over deflection wheels. The rear side which in this way comprises substantially polyamide is more abrasion-resistant and has a lower coefficient of friction, with the result that less wear occurs during deflection about the rear side of the elevator belt 12 and the energy requirement for moving the elevator belt is reduced. In a modification (not shown), the web 15.1 extends over the entire rear side of the elevator belt 12.

FIG. 5 shows a cross section through an elevator belt 12 according with an embodiment of the present invention. Components which coincide with FIG. 1 are denoted by the same designations, with the result that only the differences from FIG. 1 will be addressed in the following text.

In accordance with FIG. 5, the two tubes 15 which are assigned in each case to one V-rib are not spaced apart from one another but rather touch one another. The spacing of the tensile force carriers 14 from the flanks of the V-ribs 13.1 is therefore advantageously homogenized, i.e. the spacing of a tensile force carrier 14 from its assigned flank does not change to such a pronounced extent between the rib tip and the rib base. This brings about improved distribution of the transmitted forces in the belt body 13.

In order to produce the elevator belt according to FIG. 5, the tensile force carriers 14 are encapsulated individually with polyamide, all the intermediate spaces between the individual wires of the tensile force carrier preferably being filled. Subsequently, in each case two tubes 15 are coated with a thermal adhesive and fed jointly to the extruder which extrudes the belt body 13. During its extrusion, the tubes 15 of the tube pairs are embedded into the belt body 13, said tubes 15 being bonded both to the belt body 13 and to one another by the thermal adhesive which is activated in the process.

a person of ordinary skill in the art would understand that the tubes of the tube pairs which are shown in FIG. 5 are also extruded jointly and are connected fixedly in the region of their common contact zone in the process. This type of configuration and manufacture also results in an increased transverse rigidity with the advantages which have already been described in the preceding text.

FIG. 6 diagrammatically shows a section through an elevator system which is installed in an elevator shaft 1 and has an elevator belt 12 according to an embodiment of the present invention. The elevator system comprises a drive 2 which is fixed in an elevator shaft 1 and has a drive wheel 4.1, an elevator cabin 3 which is guided on cabin guide rails 5 and has deflection wheels which are attached below the cabin floor 6 in the form of cabin carrying rollers 4.2, a counterweight 8 which is guided on counterweight guide rails 7 and has a further deflection wheel in the form of a counterweight carrying roller 4.3, and the elevator belt 12 for the elevator cabin 3 and the counterweight 8, which elevator belt 12 transmits the drive force from the drive wheel 4.1 of the drive unit 2 to the elevator cabin and the counterweight.

The elevator belt 12 is fastened at one of its ends below the drive wheel 4.1 to a first belt fixing point 10. From the latter, it extends downward as far as the counterweight carrying roller 4.3, wraps around the latter and extends from the latter to the drive wheel 4.1, wraps around the latter and extends downward along the cabin wall on the side of the counterweight, wraps around in each case one cabin carrying roller 4.2 which is attached below the elevator cabin 3 by in each case 90° on both sides of the elevator cabin, and extends upward along the cabin wall which faces away from the counterweight 8 to a second belt fixing point 11.

The plane of the drive wheel 4.1 can be arranged at right angles to the cabin wall which is on the side of the counterweight, and its vertical projection can lie outside the vertical projection of the elevator cabin 3. It is therefore to be preferred that the drive wheel 4.1 has a small diameter, in order that the spacing between the left cabin wall and that wall of the elevator shaft 1 which lies opposite it can be as small as possible. Moreover, a small drive wheel diameter makes it possible to use a drive motor without a gear mechanism and with a relatively low drive torque as drive unit 2.

The drive wheel 4.1 and the counterweight carrying roller 4.3 are provided on their periphery with grooves which correspond to the grooves 13.1 of the elevator belt 12. Where the elevator belt 12 wraps around one of the drive or deflection wheels 4.1 or 4.3, the ribs which are arranged on its contact face lie in corresponding ribs of the drive or deflection wheel, as a result of which excellent guiding of the elevator belt on said wheels is ensured. Moreover, the tractability is improved by the wedge action which is produced between the grooves of the drive wheel 4.1 and the ribs of the elevator belt 12.

In the elevator system which is shown in FIG. 6, the deflection rollers 4.2 which serve as cabin carrier rollers below the elevator cabin 3 are wrapped around in such a way that that contact side of the elevator belt 12 which has the V-ribs faces away from the periphery of the deflection rollers 4.2. Here, the elevator belt bears with its rear layer against the deflection rollers 4.2, this rear layer having a low coefficient of friction in comparison with the deflection rollers 4.2, as described in the preceding text. In order to ensure lateral guidance of the elevator belt in this region, two additional guide rollers 4.4 which are provided with wedge grooves are attached to the cabin base 6, the wedge grooves of said guide rollers 4.4 interacting with the V-ribs of the elevator belt 12 as lateral guidance.

The invention claimed is:

1. An elevator belt, comprising:
    a belt body made from a first material;
    a tube arrangement made from a second material, the tube arrangement comprising at least one tube embedded in the belt body, an outer surface of each tube of the tube arrangement directly adjacent to, and entirely encased by, the belt body; and
    a tensile force carrier arrangement having at least one tensile force carrier, the at least one tensile force carrier disposed within the at least one tube of the tube arrangement, the at least one tensile force carrier completely encased within the at least one tube of the tube arrangement, wherein each tensile force carrier of the tensile force carrier arrangement is separated from the first material by each respective tube of the tube arrangement,
    wherein the second material is less susceptible to stress concentrations than the first material.

2. The elevator belt of claim 1, further comprising a plurality of tensile force carriers, wherein each of the plurality of tensile force carriers disposed within each respective tube of the tube arrangement.

3. The elevator belt of claim 1, wherein each tensile force carrier of the tensile force carrier arrangement is enclosed by a respective substantially concentric tube.

4. The elevator belt of claim 1, wherein the at least one tube of the tube arrangement encloses the at least one tensile force carrier of the tensile force carrier arrangement in a cover-like manner.

5. The elevator belt of claim 1, wherein the at least one tensile force carrier of the tensile force carrier arrangement is embedded in a strand-like tube of the tube arrangement, the strand-like tube comprising a plurality of strands.

6. The elevator belt of claim 1, wherein the tube arrangement comprises a first and second tube, the first tube being connected to the second tube via a web.

7. The elevator belt of claim 6, wherein the web is arranged substantially centrally with respect to at least one of the first and second tubes that are connected by the web and the respective tensile force carriers arranged within each of the first and second tubes.

8. The elevator belt of claim 6, characterized in that the web is arranged substantially tangentially with respect to the first and second tubes.

9. The elevator belt of claim 8, wherein the web at least partially forms a rear side of the elevator belt, the rear side of the belt disposed opposite a contact face of the elevator belt for interacting with a drive wheel of an elevator system.

10. The elevator belt of claim 1, wherein the belt body comprises a contact face for interacting with a drive wheel of an elevator system, the contact face having at least one V-rib formed thereon.

11. The elevator belt of claim 1, wherein the first material comprises an elastomer.

12. The elevator belt of claim 11, wherein the elastomer is chosen from the group consisting of polyurethane (PU), chloroprene rubber (CR), and ethylene-propylene-diene rubber (EPDM).

13. The elevator belt as of claim 1, wherein the second material comprises a thermoplastic polymer.

14. The elevator belt of claim 13, wherein the thermoplastic polymer is selected from the group consisting of polyamide (PA), polyethylene (PE), polyester, polyethylene terephthalate (PET), polycarbonate (PC), polypropylene (PP), polybuteneterephthalate (PBT), polyethersulfone (PES), polyphenylene sulfide (PPS), polytetrafluor ethylene (PTFE), polyvinyl chloride (PVC), and a polyblend thereof.

15. The elevator belt of claim 13, wherein the second material comprises a woven fabric of the thermoplastic polymer.

16. The elevator belt of claim 1, wherein the at least one tensile force carrier of the tensile force carrier arrangement is configured as a single wire.

17. The elevator belt of claim 1, wherein the at least one tensile force carrier is constructed from wires having one or more strands, the strands comprising at least one of steel and plastic.

18. A manufacturing method for the elevator belt of claim 1, comprising:
   producing the tube arrangement from the second material;
   arranging the at least one tensile force carrier in the at least one tube of the tube arrangement;
   producing the belt body from the first material; and
   connecting the belt body and the tube arrangement such that the at least one tube is embedded in the belt body.

19. An elevator system comprising an elevator cabin, a drive having a drive wheel, and a belt arrangement having at least one elevator belt of claim 1.

* * * * *